Jan. 26, 1932.     W. W. WELLS     1,842,485
TRANSMISSION MECHANISM
Filed Feb. 2, 1925     2 Sheets-Sheet 1
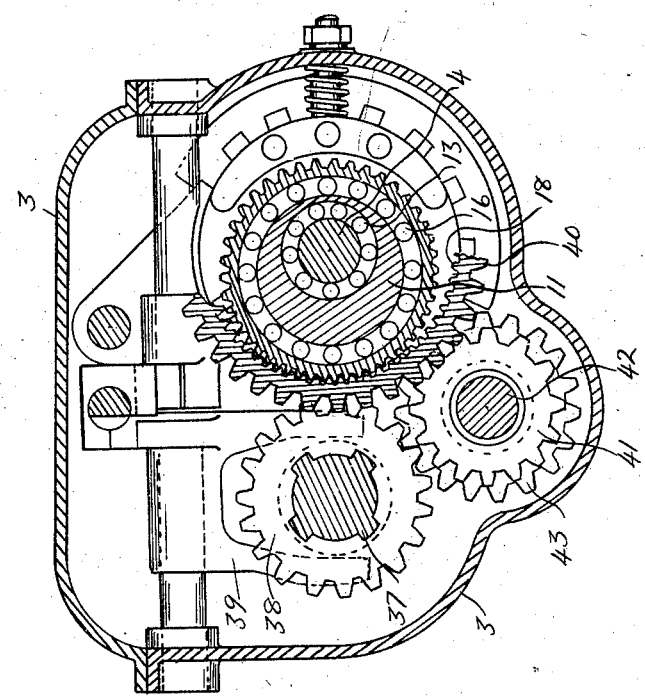
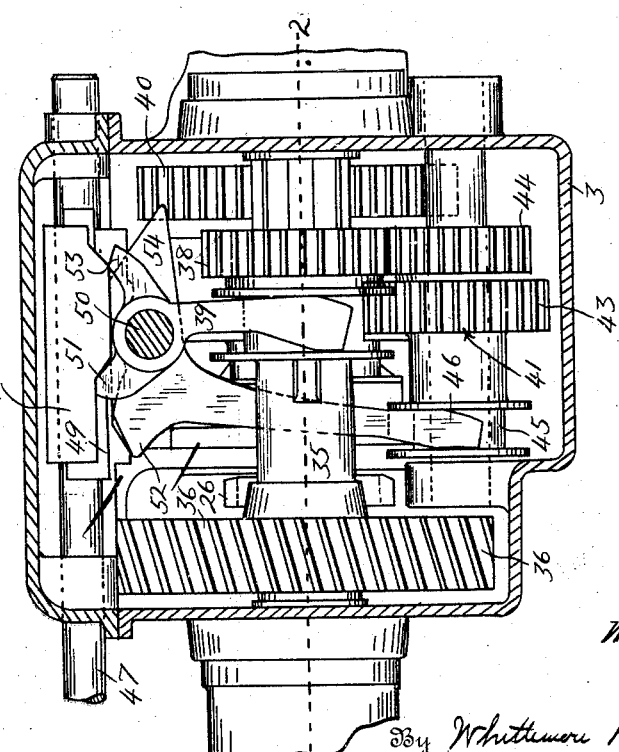
Inventor
Walter W. Wells
By Whittemore Hulbert Whittemore
+Belknap    Attorneys Jan. 26, 1932. W. W. WELLS 1,842,485
TRANSMISSION MECHANISM
Filed Feb. 2, 1925 2 Sheets-Sheet 2
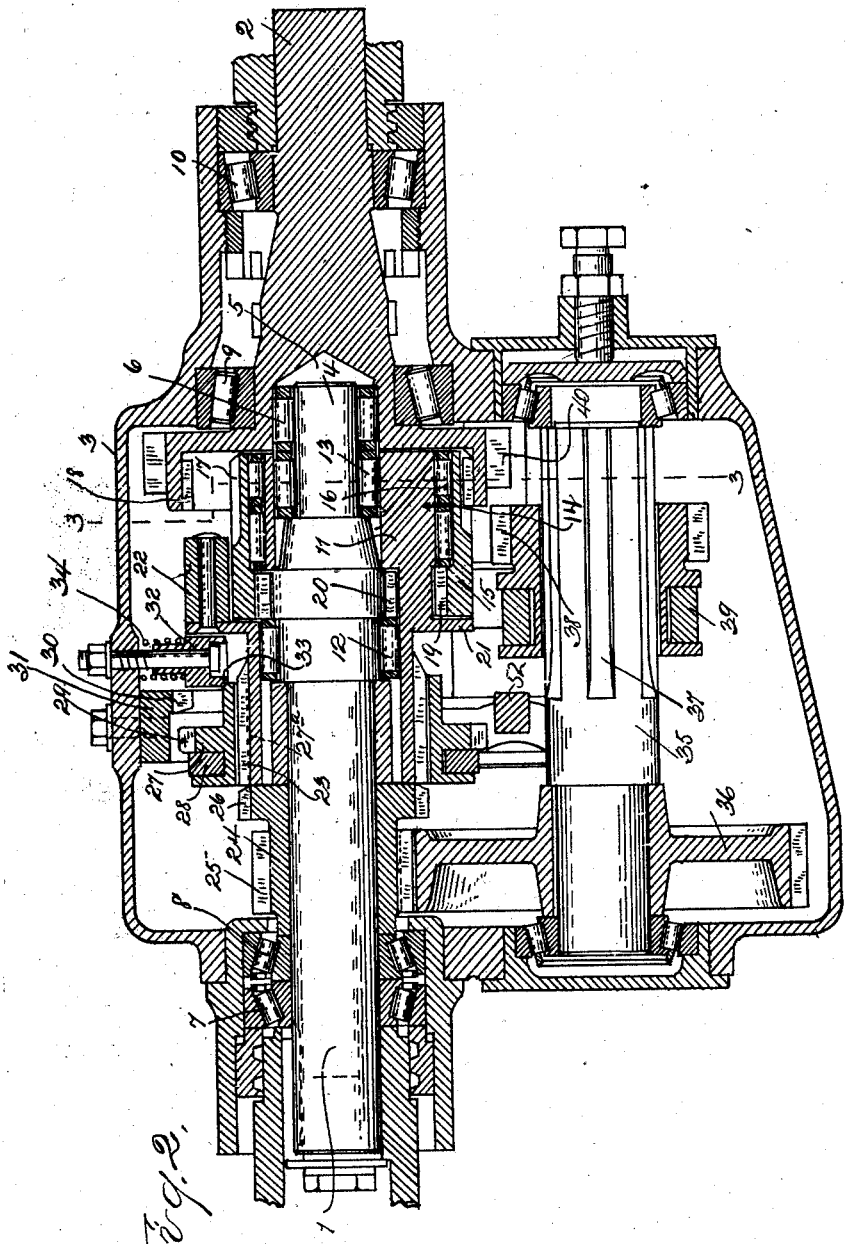
Inventor
Walter W. Wells Patented Jan. 26, 1932

1,842,485

UNITED STATES PATENT OFFICE

WALTER W. WELLS, OF LANSING, MICHIGAN, ASSIGNOR TO REO MOTOR CAR COMPANY, OF LANSING, MICHIGAN, A CORPORATION OF MICHIGAN

TRANSMISSION MECHANISM

Application filed February 2, 1925. Serial No. 6,379.

The invention relates to transmission mechanisms for motor vehicles.

One of the objects of the invention is to provide a motor vehicle transmission in which the low and reverse speeds are obtained in the usual way by means of a countershaft, but the high and intermediate speeds are both obtained independent of said counter-shaft by different positions of adjustment of continuously meshing internal gears.

A further object is to obtain a transmission of the above described type which is arranged to have the high and intermediate ratios closer together than in the conventional three forward speed transmissions and designed to be used with axle ratios higher than the usual standard so that the motor vehicle will be equipped with two alternative noiseless drives adapted respectively for flat and hilly road conditions.

Other objects reside in the novel arrangements and combinations of parts which are hereinafter more fully described and illustrated in the accompanying drawings wherein :—

Figure 1 is a side elevation of the transmission mechanism with the housing broken away;

Figure 2 is a horizontal section on the line 2—2 of Figure 1;

Figure 3 is a transverse section on the line 3—3 of Figure 2.

1 is the driving shaft of the transmission, 2 is the driven shaft and 3 the transmission casing. The driving and driven shafts are in axial alignment, the former having the reduced portion 4 at its inner end rotatably supported in the recess 5 in the driven shaft by the roller bearing 6. The driving shaft is further journaled in the casing by the tapered roller bearings 7 and 8 at the forward end of the same while the driven shaft is rotatably mounted on the tapered roller bearings 9 and 10 at the rear of the casing. 11 is a rotatable carrier journaled on the driving shaft by means of the roller bearings 12 and 13, the rear end of the carrier having an eccentric hub 14 which carries an intermediate gear 15 by means of the roller bearings 16. This gear has the external teeth 17 formed thereon meshing with the internal teeth 18, the latter being formed at the forward end of the driven member 2. The intermediate gear also has the internal teeth 19 which mesh with the pinion teeth 20 on the driving shaft so that the driving and driven shafts are at all times connected through the intermediate gear. The carrier 11 has the radially projecting flange 21 to which is secured the counterweight 22 adapted to balance the carrier during its rotative movement and also is provided at its forward end with the external teeth 23.

24 is a pinion keyed to the driving shaft 1 and provided with the external teeth 25 and the clutch teeth 26, the latter being adjacent the teeth 23 on the rotatable carrier 11. 27 is a clutch ring having the internal teeth 27ª engaging the external teeth 23, this ring being longitudinally slidable by means of a shifting fork 28 and adapted to engage in its forward position the clutch teeth 26 thereby coupling the rotatable carrier to the driving shaft. The clutch ring 27 also has the external teeth 29, which when the ring is in its rearward position are adapted to engage the internal clutch teeth 30, the latter being formed on a ring 31 fixedly secured to the transmission casing. In this position therefore, the rotatabe carrier 11 is locked to the transmission case.

In order to stop the rotation of the ring 27 before clutching the same to the fixed ring 31, there is provided a brake shoe 32 having a cam surface 33 adapted to engage the ring 27, the brake shoe being yieldingly held outward by the coil spring 34.

It will be observed that in the construction as thus far described, the driving and driven shafts may be directly coupled by moving the clutch ring 27 to its forward position thereby causing the carrier 11 and the intermediate gear 15 to revolve as a unit with the driving and driven shafts. When the clutch ring 27 is in its rearward position, the carrier 11 is fixed and the drive is then transmitted by the intermediate gear 15 which revolves on the eccentric hub 14 and is in mesh both with the pinion 20 and the internal gear 18. There is also an intermediate position of the clutch ring 27 where it is neither engaged with the driving clutch teeth 26 or the fixed clutch teeth 30 and in this position the carrier or eccentric 11 is free to float, its motion depending entirely on the relative motion of the driving and driven shafts.

In order to connect the driving and driven shafts when the clutch ring is in its intermediate position there is provided a countershaft 35 continuously driven by the driving shaft 1 by reason of the constant mesh gears 25 and 36, the latter being keyed to the countershaft. The countershaft is adapted to be connected to the driven shaft 2 by one or more selective gear trains and in the specific instance illustrated there are two connections, one forming the low speed and the other the reverse. The countershaft is provided with splines 37 on which a gear 38 is longitudinally slidable being actuated by the shifting fork 39. This gear is normally running idle, but when shifted to its rear position is adapted to engage the external teeth 40 formed on the driven shaft 2. 41 is a reverse idler gear rotatably mounted on the shaft 42 and provided with two sets of external gear teeth 43 and 44 respectively. The gear is also provided with the collar 45 for receiving the shifting fork 46, the latter serving to move the same longitudinally upon the shaft 42 in order that the teeth 44 will mesh with the teeth 40 and the teeth 43 will mesh with the countershaft gear 38. This forms the reverse drive for the transmission since by interposing the idler gear the shaft 2 is compelled to rotate oppositely to the driving shaft 1.

In order to selectively shift the countershaft gear 38 and the reverse idler gear 41, there is provided a control rod 47 carrying the cams 48 and 49. The shifting forks 39 and 46 are rockable on a shaft 50 extending transversely of the transmission and each is provided with cam engaging arms 51 and 52 respectively arranged to cooperate with the cams 48 and 49. Figure 2 illustrates the mechanism in its neutral position with the countershaft gear 38 and the reverse idler gear 41 both out of engagement with the driven shaft. When the control rod 47 is moved forwardly, the cam 48 depresses the arm 51, thereby rocking the shifting fork 39 about the shaft 50 and moving the countershaft gear 38 into engagement with the gear 40. The cam 49, however, does not change the position of the shifting fork 46 which remains as shown in the drawing. When the control rod 47 is returned to its neutral position the cam 48 depresses the arm 53 of the shifting fork 39 thereby returning the same to its original or neutral position. If the rod 47 is now moved rearwardly, the shifting fork 39 remains in the same position, but the shifting fork 46 is caused to move rearwardly by reason of the depression of the arm 52 by the cam 49 and in this position the reverse idler gear 41 is meshed with the countershaft gear 38 and the gear 40 on the driven shaft. When the rod 47 is again moved to its neutral position the cam 49 depresses the arm 54 of the shifting fork 46 thereby rocking the latter about the shaft 50 and returning the reverse idler gear 41 to the neutral position as shown in Figure 2.

From the above description it will be apparent that my improved transmission has three forward speeds and one reversing speed and that two of the forward speeds are obtained by the controlling of the movement of the eccentric or carrier 11 while the other speeds are obtained by allowing the carrier to float and coupling the driving and driven shafts through gearing on the countershaft.

Assuming now that the gear 20 has 20 teeth, the gear 19, 27 teeth, gear 17, 36 teeth and gear 18, 43 teeth, the intermediate drive when the clutch ring 27 is fixed against rotation will give a ratio of 1.61 to one between the driving and driven shafts. Assuming also, that the gears forming the countershaft drive have the following ratios, gear 25, 18 teeth, gear 36, 50 teeth, gear 38, 19 teeth, gear 40, 32 teeth, gear 43, 18 teeth and gear 44, 14 teeth, the following ratios may be obtained. When the countershaft gear 38 is meshed directly with the gear 40 on the driven shaft, the ratio is 4.68 to one, this being the low forward speed and when the reverse idler gear is interposed between the countershaft gear and the driven shaft, the ratio is 6.02 to one, this being the reversing speed of the transmission. The transmission having the ratios above mentioned is particularly adapted for use on a motor vehicle having a rear axle ratio of 3.7 to one and when used in this combination the motor vehicle is provided with the following ratios:

| | |
|---|---|
| High speed | 3.7 to one; |
| Intermediate speed | 5.95 to one; |
| Low speed | 17.3 to one; |
| Reverse | 22.3 to one. |

The transmission above described and having the ratios as set forth has been designed as a substitute for a transmission of the conventional type, which when used on a motor vehicle was arranged to provide the following speed ratios for the vehicle:

| | |
|---|---|
| High speed | 4.7 to one; |
| Intermediate speed | 8.45 to one; |
| Low speed | 17.3 to one; |
| Reverse | 23.5 to one. |

It will be observed that the ratios provided by the new transmission differ from the old in that the high and intermediate speeds are both higher than in the old design, while the low and reverse speeds are substantially the same. The advantage of the new construction is that because both the high and intermediate speeds are obtained through the internal gear mechanism, each will provide a quiet drive so that either may be used for transmitting the power to the motor vehicle without being objectionable to the occupants of the car. Therefore, the direct drive is given a higher ratio than the usual standard so that on flat roads where running conditions are ideal the motor vehicle will operate more efficiently than with the old ratios. On the other hand, when hilly country or bad road conditions are encountered, the transmission may be shifted to the intermediate speed which is less than the high speed of the old design, but more than the intermediate speed thereof. This provides a much more efficient driving mechanism under the abnormal driving conditions and because of the noiseless driving arrangement the driver of the car will not object to operating the same in intermediate gear. Thus, with the new transmission two efficient driving ratios are obtained instead of the one compromise ratio that has always heretofore been adopted by motor car designers in order that the car might operate in high gear under widely different road conditions.

What I claim as my invention is:—

1. In a transmission, a drive shaft, a driven shaft, a countershaft parallel to said shafts, constant mesh gears connecting said drive and countershafts, a pinion on said drive shaft, an internal gear on said driven shaft, a carrier journaled on said drive shaft, an intermediate gear eccentrically journaled on said carrier and provided with internal and external teeth meshing respectively with said pinion and said internal gear, a clutch ring longitudinally slidable on said carrier and non-rotatably secured thereto, clutch teeth on said driving shaft, fixed clutch teeth, means for shifting said clutch ring to alternatively engage the first menioned or second mentioned clutch teeth, said ring having an intermediate position not engaging any of said teeth, an external gear on said driven shaft, a sliding gear on said countershaft, and means for connecting said sliding gear and said external gear to drive the latter from the former.

2. In a transmission, a driving shaft, a driven shaft, a countershaft, a reverse gear shaft, constant mesh gears between said drive and countershafts, a pinion on said drive shaft, an internal external gear member on said driven shaft, a carrier journaled on said drive shaft, an intermediate gear eccentrically journaled on said carrier and provided with internal and external teeth respectively meshing with said pinion and the internal portion of said internal external gear, a clutch ring longitudinally slidable on said carrier and non-rotatably secured thereto. clutch teeth on said driving shaft, fixed clutch teeth, means for shifting said clutch ring to alternatively engage the first mentioned or second mentioned clutch teeth, said ring having an immediate position not engaging any of said teeth, a sliding gear on said countershaft, means for shifting said countershaft gear to engage the external portion of said internal external gear, a reverse idler gear on said reverse shaft, and means for shifting said reverse idler gear to simultaneously engage said countershaft gear and the external portion of said internal external gear.

3. In a transmission, the combination of a drive shaft, a driven shaft, a countershaft, constant mesh gears between said drive shaft and said countershaft, an external internal gear on said driven shaft, a countershaft gear slidably engageable with the external portion of said internal external gear, a pinion on said drive shaft, an eccentrically journaled member having internal teeth engageable with said pinion and external teeth engageable with the internal portion of said internal external gear, and a rotatable carrier for said eccentric member means for locking said carrier from rotation or connecting the same to one of said shafts, and means for connecting said driving and driven shafts through said internal external gear independently of said countershaft or through said countershaft independently of said internal external gear.

4. In a transmission, the combination of a driving and a driven shaft in axial alignment, gears on said shafts, an eccentrically mounted two speed gear mechanism having an eccentric gear member engageable with both of said gears to form a reduction mechanism between said driving and driven shafts, a countershaft, a constant mesh gear train between said driving shaft and countershaft, a gear on said countershaft between said constant mesh gear train and the intersection with said countershaft of the plane defining the end of said eccentric gear member furthest from said constant mesh gear train and, means for connecting said countershaft gear with said driven shaft.

5. In a transmission, the combination of driving and driven shafts in axial alignment, gears on said shafts, an eccentrically mounted two speed gear mechanism having a rotatable carrier, and an eccentric gear mounted on said carrier and meshing with both of said first mentioned gears, a countershaft, a gear train between said drive shaft and countershaft, a gear train between said driven shaft and countershaft, said last mentioned gear train being located between the plane of said first mentioned gear train and the plane defining the end of said eccentric gear furthest from said first mentioned gear train, means for disconnecting one of said gear trains, and means for controlling the movement of said carrier to provide coupling arrangements between said driving and driven shafts.

6. In a transmission, the combination of a driving and a driven shaft in axial alignment, gears on said shafts, one being external and the other internal external, an eccentric gear member having external and internal teeth engageable respectively with the aforesaid gears to form a reduction mechanism between said driving and driven shafts, a countershaft, a gear train between said driving shaft and countershaft, a gear train between said driven shaft and countershaft, one of said gear trains including the first mentioned internal external gear, means for disconnecting one of said gear trains means operable when said gear train is disconnected to form a direct drive coupling between said driving and driven shafts, and control means for said reduction mechanism movable into three positions, said means being adapted in one position to directly connect said driving and driven shafts and adapted in another position to connect said shafts at the ratio of the gears of said reduction mechanism and adapted in an intermediate position to permit independent rotation of said shafts.

7. In a transmission, the combination of a driving and a driven shaft in axial alignment, gears on said shafts, one being external and the other internal, an eccentric gear member having external and internal teeth engageable respectively with the aforesaid gears to form a reduction mechanism between said driving and driven shafts, a countershaft, a gear train between one of said shafts and said countershaft, a gear on said countershaft between said gear train and the intersection with said countershaft of the plane defining the end of said eccentric gear member furthest from said gear train, gearing connecting said last mentioned gear with the other of said shafts means forming a direct coupling between said driving and driven shafts, and control means for said reduction mechanism movable into three positions, said means being adapted in one position to directly connect said driving and driven shafts and adapted in another position to connect said shafts at the ratio of the gears of said reduction mechanism and adapted in an intermediate position to permit independent rotation of said shafts.

8. In a transmission, the combination of two main shafts in axial alignment, one of said shafts being the driving shaft and the other the driven shaft, gears on said shaft, an eccentrically mounted two-speed gear mechanism having an eccentric gear member engageable with both of said gears to form a reduction mechanism between said main shafts, a countershaft, a constant mesh gear train between one of said main shafts and said countershaft, a gear train between the other of said main shafts and said countershaft, said last mentioned gear train including a gear on said countershaft spaced from said constant mesh gear train by a distance not greater than the distance between said eccentric gear member and said constant mesh gear train.

In testimony whereof I affix my signature.
WALTER W. WELLS.